US012291986B1

(12) United States Patent
Dahlgren

(10) Patent No.: US 12,291,986 B1
(45) Date of Patent: May 6, 2025

(54) UTILITY VEHICLE TRANSMISSION EXHAUST DUCT

(71) Applicant: DEERE & COMPANY, Moline, IL (US)

(72) Inventor: William R. Dahlgren, Mayville, WI (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 18/736,000

(22) Filed: Jun. 6, 2024

(51) Int. Cl.
*F01N 13/08* (2010.01)
*F02M 35/10* (2006.01)

(52) U.S. Cl.
CPC ............. *F01N 13/08* (2013.01); *F02M 35/10* (2013.01)

(58) Field of Classification Search
CPC ............... F01N 2260/022; F01N 11/00; F01N 2590/00; F01N 11/007; F01N 13/008; F01N 13/08; F01N 13/10; F01N 2260/02; F01N 2590/04; F01N 13/1805; F01N 13/1811; F01N 3/055; B60K 13/02; B60K 13/04; B60R 13/0876
See application file for complete search history.

(56) References Cited

U.S. PATENT DOCUMENTS

| | | | |
|---|---|---|---|
| 4,061,117 | A | 12/1977 | Ikeura |
| 4,186,694 | A | 2/1980 | Koseki |
| 4,697,665 | A | 10/1987 | Eastman et al. |
| 5,976,044 | A | 11/1999 | Kuyama |
| 6,705,417 | B2 | 3/2004 | Kitai et al. |
| 7,363,999 | B2 | 4/2008 | Hastings |
| 8,002,061 | B2 | 8/2011 | Yamamura et al. |
| 8,016,094 | B2 | 9/2011 | Murayama et al. |
| 8,157,039 | B2 | 4/2012 | Melvin et al. |
| 8,302,711 | B2 | 11/2012 | Kinsman et al. |
| 8,439,141 | B2 | 5/2013 | Bessho et al. |
| 8,596,406 | B2 | 12/2013 | Itoo et al. |
| 8,613,335 | B2 | 12/2013 | Deckard et al. |
| 8,695,775 | B2 | 4/2014 | Inomori et al. |
| 8,746,394 | B2 | 6/2014 | Kuramoto et al. |
| 8,801,561 | B1 | 8/2014 | Kii |
| 8,827,019 | B2 | 9/2014 | Deckard et al. |
| 8,863,887 | B2 | 10/2014 | Kii |

(Continued)

FOREIGN PATENT DOCUMENTS

| | | | |
|---|---|---|---|
| CA | 3022389 | A1 | 11/2017 |
| WO | WO 2017187411 | A1 | 11/2017 |
| WO | WO 2017187413 | A1 | 11/2017 |

*Primary Examiner* — Anthony Ayala Delgado

(57) ABSTRACT

Provided is a transmission exhaust system for a utility vehicle. The utility vehicle may include a power source compartment which houses, among other components, a power source, a power source exhaust system, a transmission within a transmission enclosure, and a transmission exhaust duct. The power source compartment may have a first end and a second end. The power source exhaust may exit the power source at or near the first end of the power source compartment. The transmission exhaust duct may allow transmission exhaust to leave the transmission enclosure at or near the second end of the power source compartment. The transmission exhaust may provide a source of airflow throughout the power source compartment, which provides cleaner air and increased pressure in the power source compartment.

12 Claims, 6 Drawing Sheets

(56) References Cited

U.S. PATENT DOCUMENTS 9,010,466 B2 4/2015 Larson et al.
9,057,432 B1 6/2015 Bouffard et al.
9,103,428 B2 8/2015 Takahashi et al.
9,182,031 B2 11/2015 Kouma et al.
9,217,501 B2 12/2015 Deckard et al.
9,365,251 B2 6/2016 Safranski et al.
9,410,512 B2 8/2016 Takahashi et al.
9,453,573 B2 9/2016 Renner et al.
9,528,595 B2 12/2016 Itoo et al.
9,587,548 B2 3/2017 Minnichsoffer et al.
9,719,591 B2 8/2017 Wade et al.
9,863,523 B2 1/2018 Stocks et al.
9,909,483 B2 3/2018 Minnichsoffer et al.
9,909,659 B2 3/2018 Bessho et al.
10,119,450 B2 11/2018 Minnichsoffer et al.
10,197,149 B2 2/2019 Kuji et al.
10,443,704 B2 10/2019 Davis
10,563,751 B2 2/2020 Steinert
11,248,512 B2 2/2022 Minnichsoffer et al.
11,655,749 B2 5/2023 Minnichsoffer et al.
11,766,932 B2 * 9/2023 Harris .................... B60G 3/185 180/311
12,092,006 B2 * 9/2024 Minnichsoffer .... F16H 57/0489
2006/0270503 A1 11/2006 Suzuki et al.
2012/0137828 A1 6/2012 Dieter et al.
2014/0187366 A1 7/2014 Kouma et al.
2014/0238185 A1 8/2014 Kii
2014/0261275 A1 9/2014 Takahashi et al.
2014/0274515 A1 9/2014 Takahashi et al.
2014/0374179 A1 12/2014 Deckard et al.
2015/0090515 A1 4/2015 Safranski et al.
2015/0300234 A1 * 10/2015 Hirukawa ........... F01N 13/1805 248/560
2015/0308560 A1 10/2015 Itoo et al.
2016/0061088 A1 * 3/2016 Minnichsoffer .......... F16H 9/14 60/320
2016/0176287 A1 6/2016 Ripley et al.
2017/0268655 A1 9/2017 Stocks et al.
2017/0276234 A1 9/2017 Kuji et al.
2018/0180163 A1 6/2018 Schleif et al.
2018/0222311 A1 8/2018 Toupin et al.
2018/0245682 A1 8/2018 Davis
2018/0306309 A1 10/2018 Steinert
2019/0120366 A1 4/2019 Leclair et al.
2019/0285159 A1 9/2019 Nelson et al.
2022/0042434 A1 * 2/2022 Tajima ...................... F16H 9/18
2022/0099055 A1 * 3/2022 Que ..................... F02M 35/048
2023/0250748 A1 8/2023 Minnichsoffer et al.

* cited by examiner

UTILITY VEHICLE TRANSMISSION EXHAUST DUCT

TECHNICAL FIELD

The present disclosure relates generally to utility vehicles, and more specifically to systems, devices, and methods for ducting air from a transmission enclosure to a power source compartment.

BACKGROUND

Utility vehicles, including but not limited to off-road utility vehicles, typically include a power train. The power train may include several components, including but not limited to, a power source and a transmission. The power source may be an internal combustion engine. The transmission may be a continuously variable transmission ("CVT"). The transmission may be housed in an enclosure. The enclosure may receive fresh air to ventilate the transmission. After ventilating the transmission, the resulting transmission exhaust may exit the enclosure.

SUMMARY

In one aspect of the invention, a utility vehicle is provided. The utility vehicle may include a power source compartment having a first and a second end, the compartment including a power source and a transmission housed in a transmission enclosure. The utility vehicle may further include a transmission air intake system configured to provide fresh air to the interior of the transmission enclosure. The fresh air moves through the enclosure, resulting in transmission exhaust. The utility vehicle may further include a transmission exhaust duct that is configured to allow transmission exhaust to exit the transmission enclosure into the power source compartment at or near the second end of the power source compartment. The transmission exhaust may be directed toward the first end of the power source compartment.

In some implementations, the transmission exhaust may ventilate substantially an entirety of the power source compartment. The transmission may be a continuously variable transmission. The power source may be an internal combustion engine. In such implementations, the utility vehicle may further include an engine exhaust system connected to the internal combustion engine which removes engine exhaust from the engine at or near the first end of the power source compartment.

The power source compartment may be at least partially defined by a pair of frame rails on each side, a seat base at the first end, and a muffler bracket at the second end. The transmission duct may include a curved portion and a spout portion. The spout portion may be configured to direct transmission exhaust from the power source compartment second end toward the power source compartment first end. In some implementations, the transmission exhaust may ventilate at least half of the power source compartment.

Also provided is a method of reducing contamination in at least one of a utility vehicle engine air intake and a utility vehicle continuously variable transmission air intake. The method may include receiving fresh air into a continuously variable transmission enclosure, circulating the fresh air in the enclosure, the air exiting the enclosure into a power source compartment, and directing the exhaust across a majority of the power source compartment. In some implementations, a pressure of the power source compartment may be increased.

In yet another aspect of the invention, a utility vehicle is provided. The utility vehicle may include an internal combustion engine connected to an engine exhaust system at a first end of an engine bay. The utility vehicle may further include a continuously variable transmission (sometimes "CVT") housed in a CVT enclosure. The CVT may receive fresh air via a CVT air intake and air intake duct that are configured to deliver fresh air inside the CVT enclosure. The utility vehicle may further include a CVT exhaust duct configured to direct CVT exhaust from said CVT enclosure to the engine bay. The CVT exhaust duct may be positioned proximate a second end of the engine bay.

The engine bay may include the internal combustion engine, the CVT housed in the CVT enclosure, and at least a portion of the engine exhaust system. The CVT exhaust duct may include a curved portion and a spout portion. The spout portion may direct transmission exhaust across the engine bay.

BRIEF DESCRIPTION OF THE DRAWINGS

The detailed description of the drawings refers to the accompanying figures.

Like reference numerals are used to indicate like elements throughout the several figures.

DETAILED DESCRIPTION

The following is a detailed description of one or more embodiments of technology, including systems, methods, and apparatuses, for a utility vehicle transmission exhaust duct.

As used herein, "e.g." is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Moreover, sometimes terms such as "above," "below," "upward," "downward," "top," "bottom," etc., will also be used in connection with describing the utility vehicle as it is oriented when it sits on the ground in its customary operating mode. However, these terms are again used for description purposes and do not represent limitations on the scope of the disclosure, unless required by the claims. In addition, terms such as "forward", "rear", and "side" may be used relative to the typical direction of forward travel of the utility vehicle. These terms are used for description purposes and do not represent limitations on the scope of the disclosure, unless required by the claims.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

Figure 1:
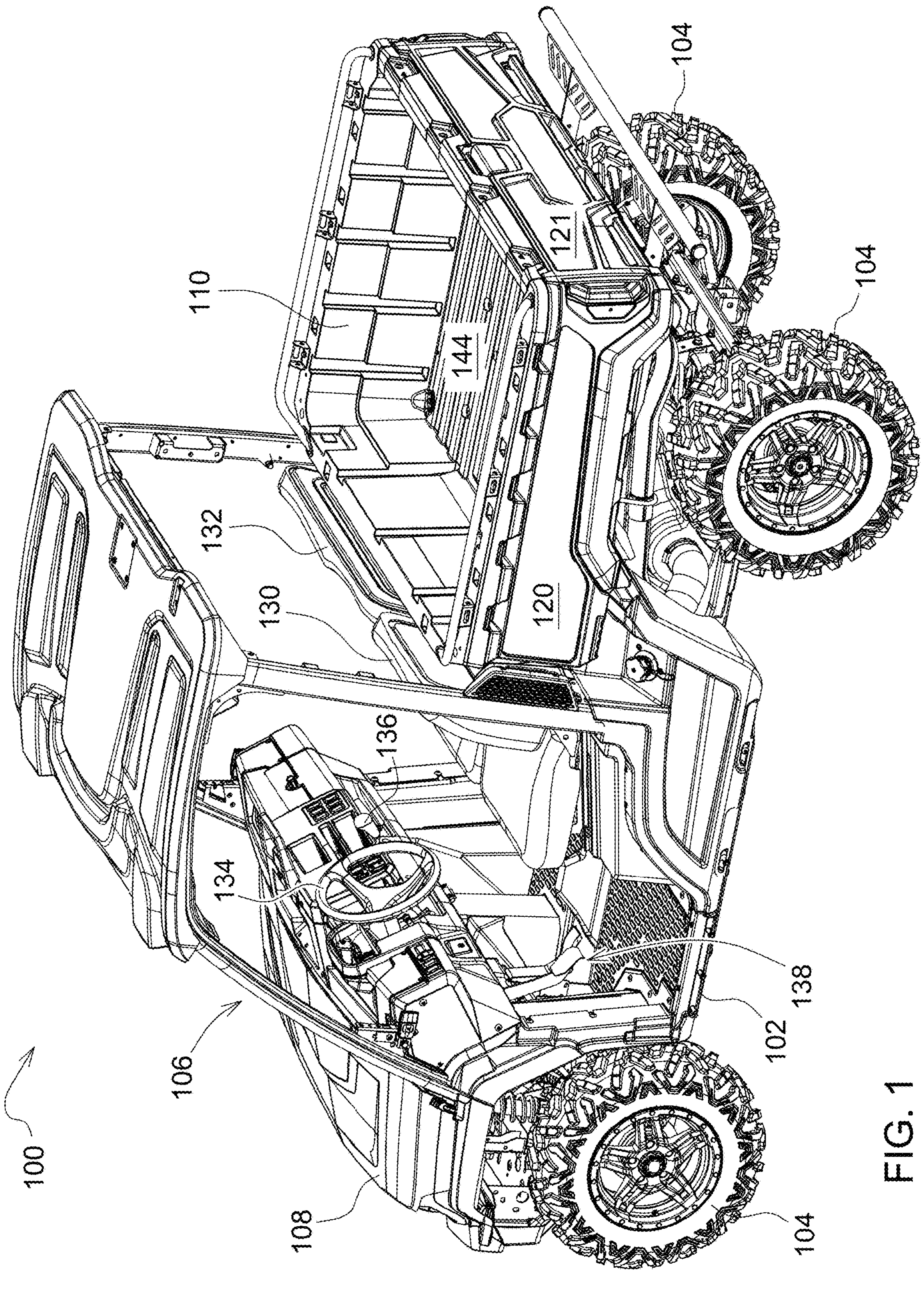
FIG. 1 is a perspective view of an implementation of a utility vehicle of the present invention.

Referring to FIG. 1, an implementation of a utility vehicle 100 of the present invention is shown. The utility vehicle 100 may include a frame 102 supported by a plurality of ground engaging members 104. Also included may be an operator/passenger compartment 106, which may include one or more seats 130, 132. The operator/passenger compartment 106 may also include one or more mechanisms for controlling the vehicle, including but not limited to a steering wheel 134, shift lever 136, and one or more foot pedals 138. Forward of the operator/passenger compartment 106 may be a hood 108 covering one or more components of the utility vehicle 100. To the rear of the operator/passenger compartment 106 may be a cargo box 110. The cargo box 110 may define a storage compartment for cargo. The cargo box 110 may be located above one or more components of the utility vehicle power train 111 (shown in FIGS. 2 and 3). The utility vehicle may also include one or more side panels 120 and a rear panel 121.

Figure 2:
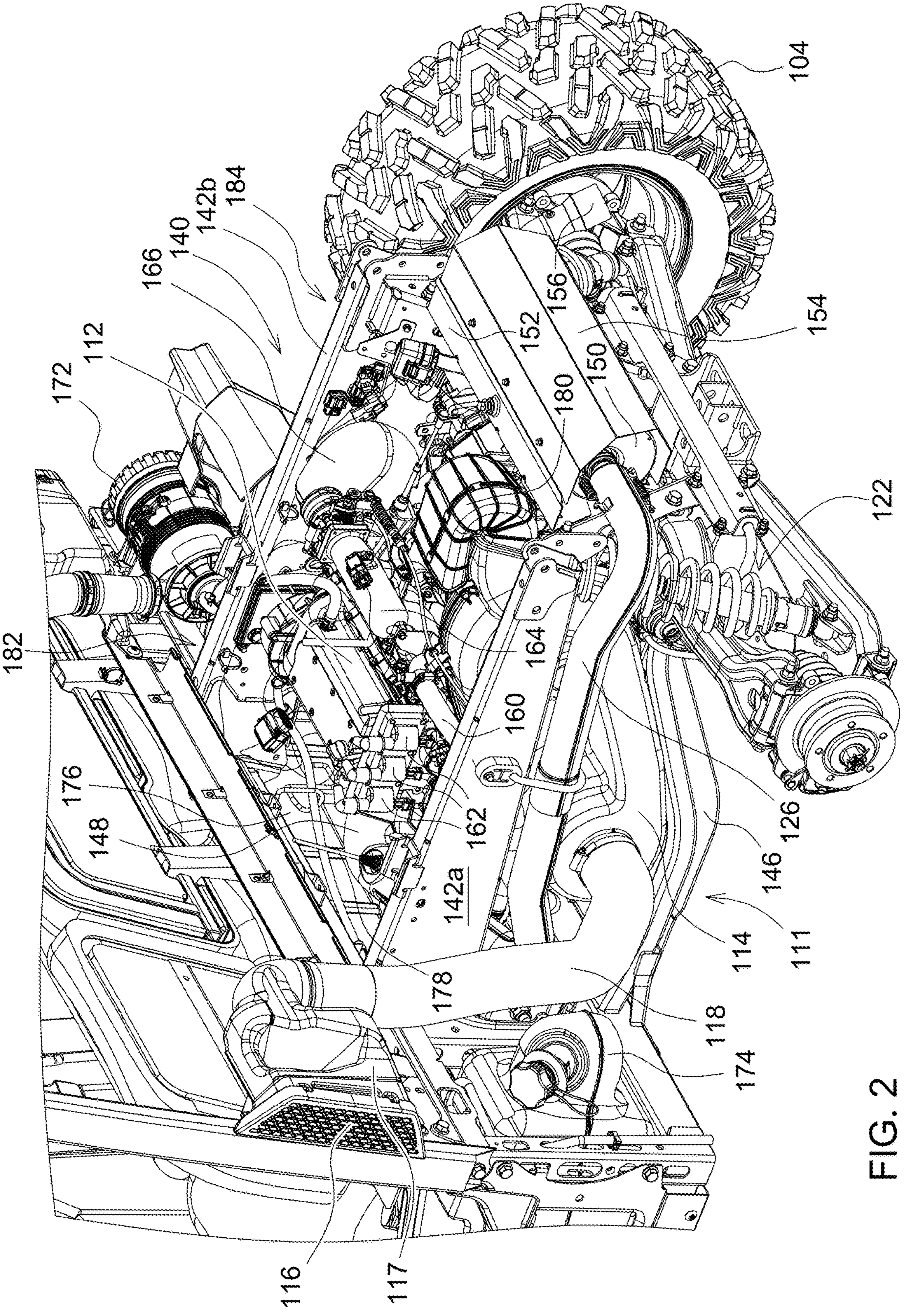
FIG. 2 is a perspective view of a power source compartment of the utility vehicle of FIG. 1.

FIG. 2 shows the utility vehicle 100 with the cargo box 110, side panels 120, and rear panel 121 removed. Also removed is a rear wheel. As such, a portion of the power train 111 is shown. The power train may include a power source and a drivetrain. Also shown in FIG. 2 are a plurality of frame rails 142*a*, 142*b*. The frame rails 142*a*, 142*b* may provide structural support, such as by providing support to the cargo box 110 and the rear shock system 122.

Figure 3:
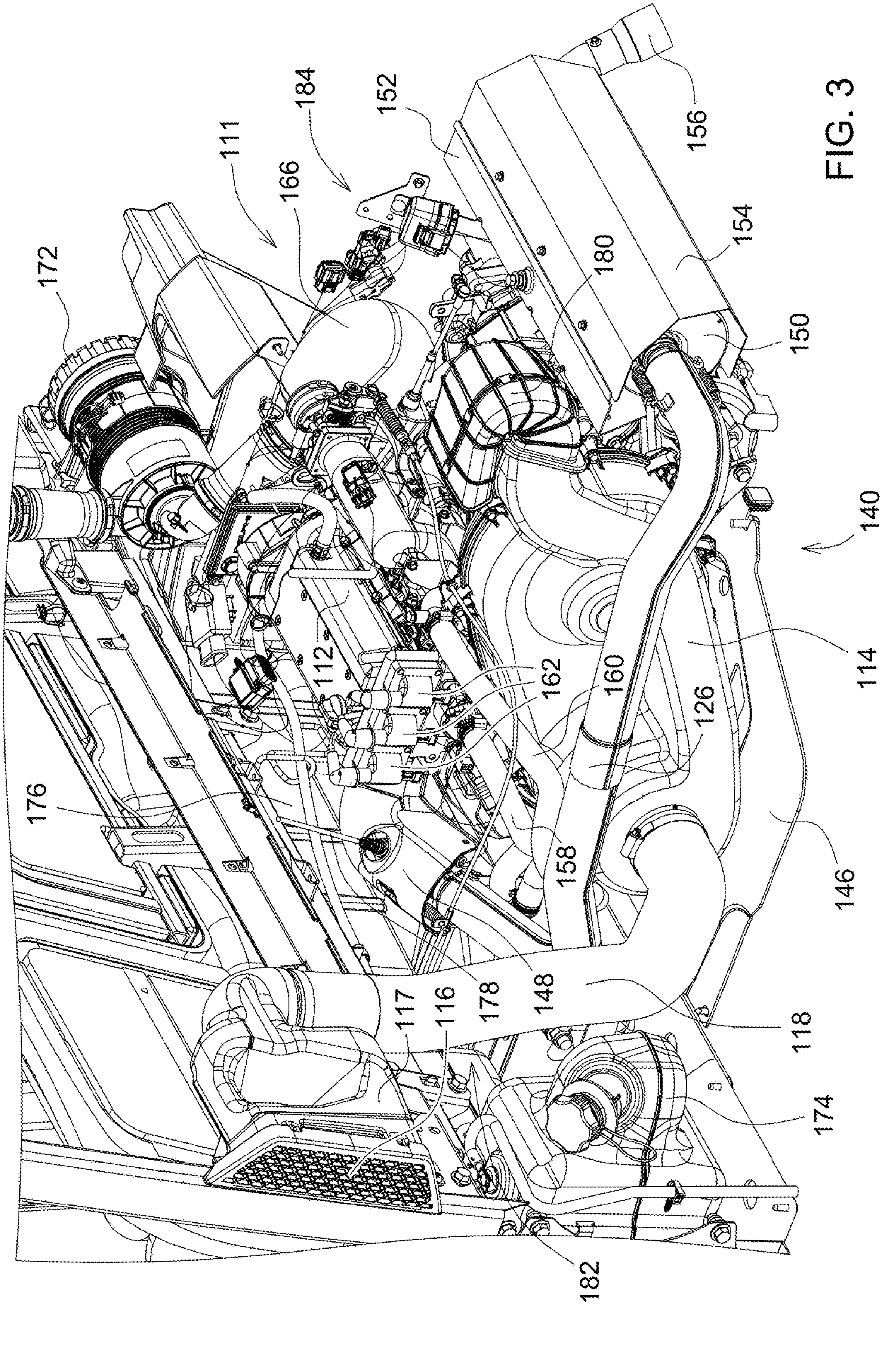
FIG. 3 is another perspective view of the power source compartment of the utility vehicle of FIG. 1.

Referring to FIGS. 2 and 3, several components of the power train 111 may be located in a power source compartment 140. The power source compartment 140 may be defined on top by the cargo box 110 floor 144 (shown in FIG. 1), on the sides by the frame rails 142*a*, 142*b*, on the bottom by a skid plate 146, in the front by the seat base 176, and in the rear by a muffler bracket 152. The power source compartment 140 may have a first end 182 and a second end 184. In the illustrated implementation, the power source compartment 140, while being generally defined by these components, is not airtight. In other words, air may move between the power source compartment 140 and the atmospheric or fresh air outside of the power source compartment 140 and utility vehicle 100. In the illustrated implementation, the power source is an engine 112. Accordingly, in the illustrated implementation, the power source compartment 140 may also be referred to as an engine bay or engine compartment. Although an internal combustion engine is shown, power source may be an electric motor, hybrid engine-motor, or any other type of power source. Also shown is a transmission housed in a transmission enclosure 114.

The engine 112 may be connected to an engine exhaust system. The engine exhaust system may include an outlet 124 (shown in FIGS. 4 and 5) through which engine exhaust exits the engine 112. The engine exhaust may then move through an engine exhaust manifold 147 which is covered by an exhaust heat shield 148. A sensor, such as an oxygen sensor 178 may extend from the heat shield 148. The heat shield 148 and sensor 178 may be located at or near the first end 182 of the power source compartment 140. The engine exhaust may then move into an engine exhaust duct, sometimes referred to as an engine exhaust pipe 126. The engine exhaust them moves through a muffler 150. The muffler 150 may be at least partially surrounded by the muffler bracket 152 and a rear heat shield 154. Engine exhaust may move from the muffler 150 through the tailpipe 156 to exit the utility vehicle.

Also located in the power source compartment 140 may be a plurality of coolant hoses 158, 160. In the illustrated implementation coolant hose 160 provides a coolant inlet, while coolant hose 158 provides a coolant outlet. The configuration of the coolant hoses 158, 160 may vary without departing from the scope of the invention, such as in the case of a different power source type and/or configuration. Also shown within the power source compartment 140 are a plurality of ignition coils 162. Further, the intake manifold 164 and an intake tube 166 are shown. The air filter canister housing 172 is shown near the power source compartment 140. Also shown near the power source compartment 140 is the fuel tank 174. It will be understood that other implementations of power source compartments may include more or fewer components than described in the illustrated implementation.

The transmission may be a continuously variable transmission (sometimes "CVT"). The transmission may be ventilated with fresh air. In the illustrated implementation, fresh air is provided via air intake 116 through the plenum 117 and further through the transmission air intake duct 118. In the illustrated implementation, the air intake 116 may be located in or near a side panel 120 of the cargo box 110, such as behind the operator/passenger compartment 106. In addition, the air intake 116 may be located above the power source compartment 140. However, any location and configuration of air intake 116 may be used. The fresh air travels through air intake duct 118 to transmission enclosure 114. The fresh air may be used to cool and/or ventilate the transmission, resulting in transmission exhaust.

The transmission exhaust may exit the transmission enclosure 114 via a transmission exhaust duct 180. The transmission exhaust duct 180 may be located at or near the second end 184 of the power source compartment 140. The transmission exhaust duct 180 may allow transmission exhaust to enter the power source compartment 140. In the illustrated implementation, the transmission exhaust duct 180 may be configured to allow transmission exhaust to enter the power source compartment 140 at or near its second end 184. As such, the transmission exhaust may be moved into the power source compartment 140 and provide airflow, such as a current or stream of air through the power source compartment 140. The transmission exhaust may ventilate the power source compartment 140.

Figure 4:
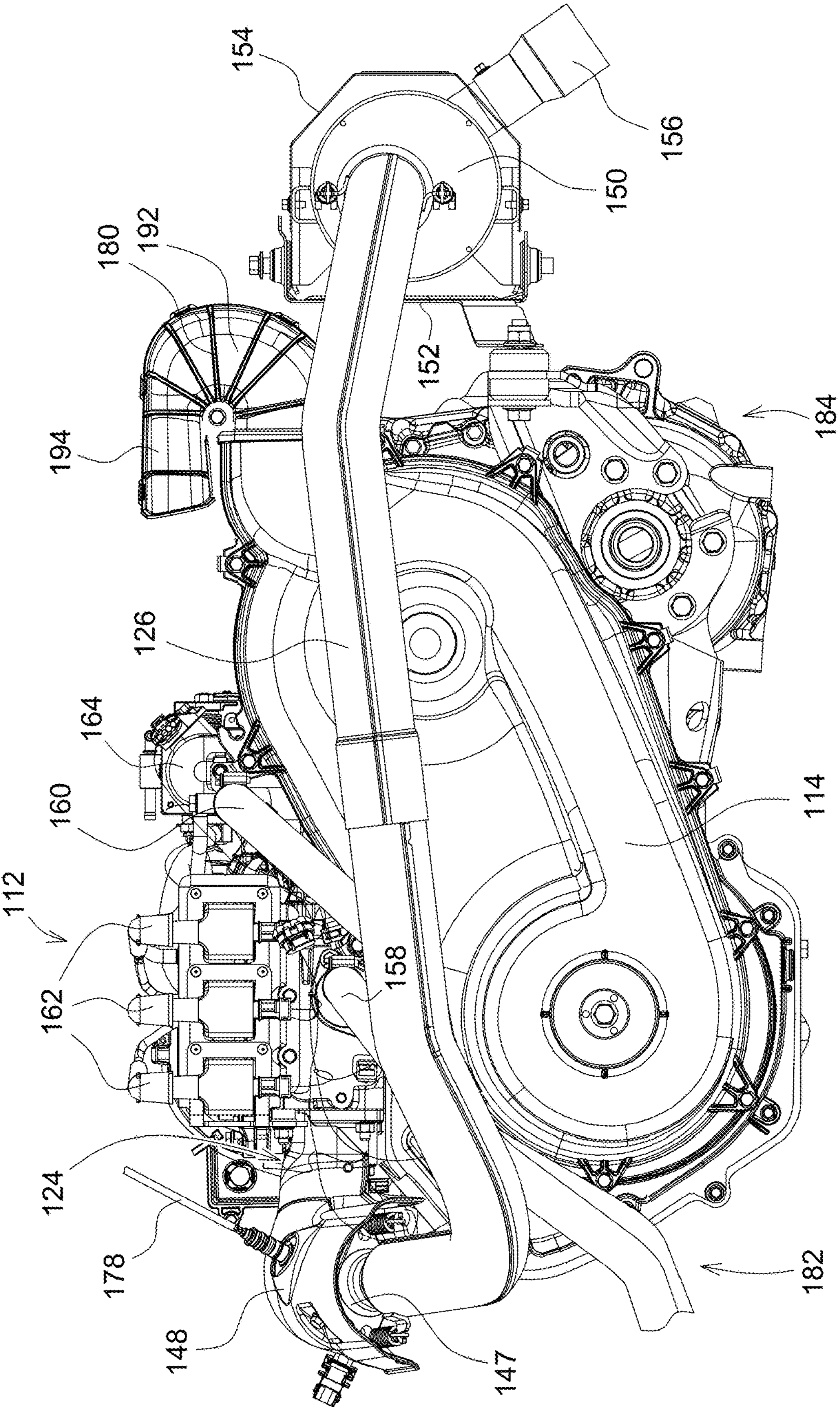
FIG. 4 is a side elevation view of the power source compartment of the utility vehicle of FIG. 1.
Figure 5:
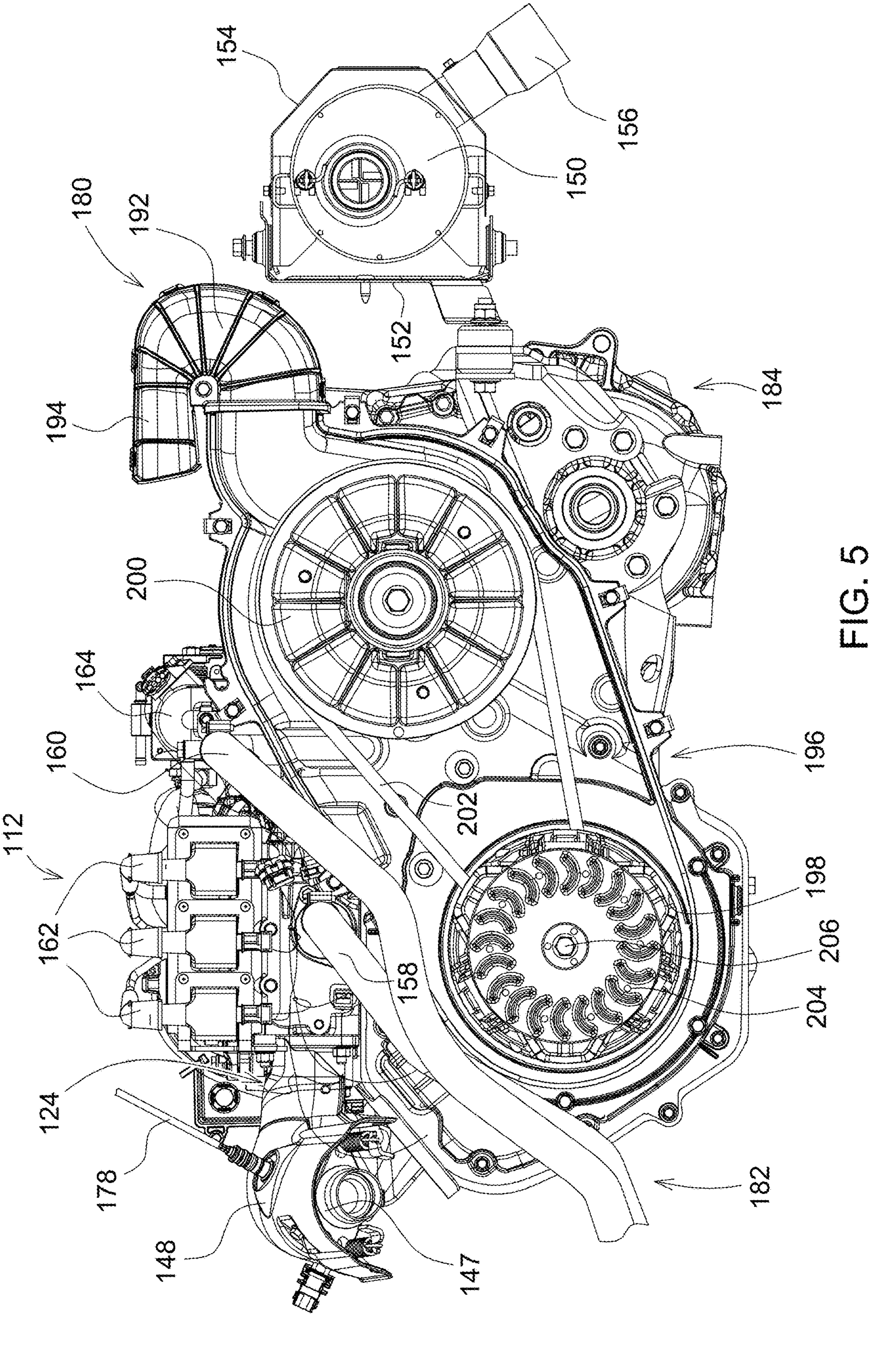
FIG. 5 is another side elevation view of the power source compartment of the utility vehicle of FIG. 1 wherein a portion of the transmission enclosure has been removed.

FIGS. 4-5 provide additional views of the transmission and transmission exhaust duct 180. FIG. 4 provides a side view of the transmission enclosure 114 and transmission exhaust duct 180. In the illustrated implementation, the transmission exhaust duct 180 includes a curved portion 192 whereby the transmission exhaust exits the transmission enclosure 114 and is moved or directed in a different direction. As noted above, in the illustrated implementation, the transmission exhaust duct 180 allows the transmission exhaust to exit at or near the second end 184 of the power source compartment. In addition, in the illustrated implementation, the transmission exhaust duct 180 directs the transmission exhaust in the direction of or toward the first end 182 of the power source compartment 140, such as via a transmission exhaust duct 180 spout 194. In other implementations, the transmission exhaust duct 180 may direct the transmission exhaust in other directions, including but not limited to upwards or toward a side. Moreover, in some implementations, the transmission exhaust duct 180 may direct the transmission exhaust in a plurality of directions. In some implementations, the transmission exhaust may ventilate all of the power source compartment or substantially all of the power source compartment. In some implementations, the transmission exhaust may ventilate at least half of the power source compartment. In some implementations, the transmission exhaust may ventilate at least 10%, 20%, 30%, 40%, 50%, 60%, 70%, 75%, 80%, 85%, 90%, 95%, 96%, 97%, 98%, 99%, or 100% of the power source compartment.

FIG. 5 shows the side view of FIG. 4 wherein a portion of transmission enclosure 114 has been removed such that the transmission can be seen. Transmission may be continuously variable transmission ("CVT") 196. CVT 196 may include a primary clutch 198 and a secondary clutch 200. The primary clutch 198 and secondary clutch 200 may be in operational engagement via a belt 202. As shown in FIGS. 1-3, transmission air intake duct 118 allows fresh air to enter enclosure 114 near primary clutch 198. The fresh air may ventilate all components within enclosure 114 and move towards transmission exhaust duct 180. Primary clutch 198 is rotated via engine 112 and crankshaft (not shown). As primary clutch 198 rotates, fan 204 also moves about a primary clutch axis 206. Fan 204 is configured to circulate air through enclosure 114 toward transmission exhaust duct 180.

Figure 6:
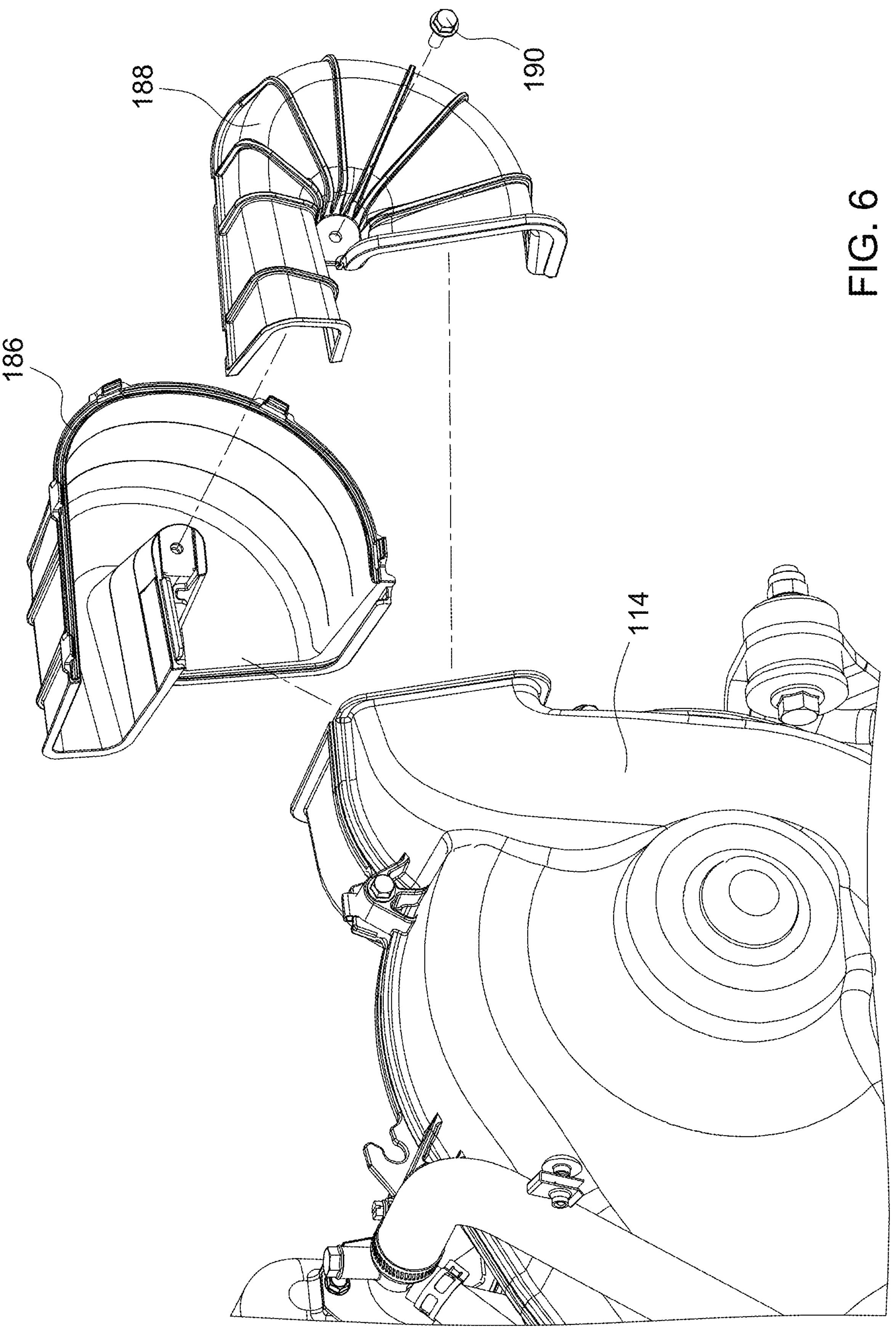
FIG. 6 is an exploded view of a transmission exhaust duct of the utility vehicle of FIG. 1.

FIG. 6 shows an exploded view of one implementation of a transmission exhaust duct 180. In the illustrated implementation, the transmission exhaust duct 180 may include a first side 186 and a second side 188. The first and second sides may be joined together by a fastener 190, such as a bolt. It will be understood that the implementation of FIG. 6 is exemplary only. The transmission exhaust duct 180 may be made of any number of pieces or parts, such as one, two, three, four, five, six, seven, eight, nine, ten, or more parts or pieces. In some implementations, the transmission exhaust duct may be made of plastic, although any suitable material may be used without departing from the scope of the invention.

Moving the transmission exhaust into the power source compartment 140 provides several advantages. First, entry of the transmission exhaust into the power source compartment 140 creates airflow to an area that would otherwise be a dead zone with little to no air exchange. Without transmission exhaust duct 180, dirty air within the power source compartment 140 is recirculated within the compartment 140. Second, entry of the transmission exhaust into the power source compartment 140 can increase the pressure in the power source compartment 140. The increased pressure can prevent contamination, such as dust in intakes located in and/or near the power source compartment 140, including but not limited to the engine air intake and the transmission air intake. Namely, without the transmission exhaust duct 180 of the present invention, debris or other contamination is more likely to come up from the ground and into the intakes. Providing cleaner air to the engine intake extends air intake filter service life. Providing cleaner air to the transmission air intake reduces the amount of contamination within the transmission, which reduces component wear. In addition, cleaner air entering the transmission enclosure results in cleaner air exiting the transmission enclosure through transmission exhaust duct 180, which ultimately results in cleaner air entering the power source compartment 140. Contamination may be in the form of water. Therefore, the increased pressure may provide water ingress resistance to the transmission and/or parts thereof. In some implementations, the transmission exhaust may have a lower temperature than at least some components and/or air in the power source compartment 140. Accordingly, the transmission exhaust may provide a cooling effect. Moreover, the transmission exhaust is cleaner air than the air that would otherwise be located in the power source compartment. As noted above, transmission may be CVT 196.

As noted above, the power source compartment 140 is not airtight. Rather, the power source compartment 140 is exposed to the air outside the utility vehicle. As such, the transmission exhaust within the power source compartment 140 escapes or exits the power source compartment 140 to the air outside the utility vehicle. In some implementations, the transmission exhaust escapes or exits the power source compartment 140 via openings in the utility vehicle frame.

Although various representative embodiments of this invention have been described above with a certain degree of particularity, those skilled in the art could make numerous alterations to the disclosed embodiments without departing from the spirit or scope of the inventive subject matter set forth in the specification and claims. Joinder references (e.g. attached, adhered, joined, connected) are to be construed broadly and may include intermediate members between a connection of elements and relative movement between elements. As such, joinder references do not necessarily infer that two elements are directly connected and in fixed relation to each other. In some instances, in methodologies directly or indirectly set forth herein, various steps and operations are described in one possible order of operation, but those skilled in the art will recognize that steps and operations may be rearranged, replaced, or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. A utility vehicle, comprising:

a power source compartment having a forward end and a rear end, the power source compartment including a power source and a transmission housed in a transmission enclosure;

a transmission air intake system configured to provide fresh air to the interior of said transmission enclosure, said fresh air moving through said enclosure to result in transmission exhaust; and a transmission exhaust duct configured to allow transmission exhaust to exit said transmission enclosure into said power source compartment at or near said second end of said power source compartment and wherein said duct directs said transmission exhaust from said rear end of said power source compartment to said forward end of said power source compartment and wherein said transmission exhaust duct faces said forward end of said power source compartment.

2. The utility vehicle of claim 1, wherein said transmission exhaust ventilates substantially an entirety of said power source compartment.

3. The utility vehicle of claim 1, wherein said transmission is a continuously variable transmission.

4. The utility vehicle of claim 3, wherein said power source is an internal combustion engine.

5. The utility vehicle of claim 4, further comprising an engine exhaust system connected to said internal combustion engine and removing engine exhaust from said engine at or near said first end of said power source compartment.

6. The utility vehicle of claim 3 wherein said power source compartment is at least partially defined by a pair of frame rails on each side, a seat base at the first end, and a muffler bracket at the second end.

7. The utility vehicle of claim 6 wherein said transmission exhaust duct comprises a curved portion and a spout portion configured to direct transmission exhaust from said power source compartment second end toward said power source compartment first end.

8. The utility vehicle of claim 7 wherein said an airflow of said transmission exhaust ventilates at least half of said power source compartment.

9. A utility vehicle, comprising:

an internal combustion engine, the internal combustion engine connected to an engine exhaust system, said exhaust system exiting said internal combustion engine at a first end of an engine bay, wherein said engine exhaust system includes an engine exhaust pipe;

a continuously variable transmission housed in a continuously variable transmission enclosure, said continuously variable transmission receiving fresh air via a continuously variable transmission air intake and continuously variable transmission air intake duct that are configured to deliver fresh air inside said continuously variable transmission enclosure;

a continuously variable transmission exhaust duct configured to direct continuously variable transmission exhaust from said continuously variable transmission enclosure to said engine bay, said continuously variable transmission exhaust duct positioned proximate a second end of said engine bay, said continuously variable transmission exhaust duct directing continuously variable transmission exhaust approximately parallel to a majority of said engine exhaust pipe.

10. The utility vehicle of claim 9, wherein said engine bay includes said internal combustion engine, said continuously variable transmission housed in a continuously variable transmission enclosure, and at least a portion of said engine exhaust system.

11. The utility vehicle of claim 7, wherein said continuously variable transmission exhaust duct includes a curved portion and a spout portion and wherein said spout portion directs transmission exhaust across said engine bay.

12. A utility vehicle, comprising:

a power source compartment having a first end and a second end and two sides therebetween, said sides at least partially defined by a pair of frame rails on each side, said power source compartment including a power source and a transmission housed in a transmission enclosure;

a power source exhaust pipe configured such that a majority of said power source exhaust pipe is located outside of said power source compartment;

a transmission air intake system configured to provide fresh air to the interior of said transmission enclosure, said fresh air moving through said enclosure to result in transmission exhaust; and a transmission exhaust duct configured to allow transmission exhaust to exit said transmission enclosure into said power source compartment at or near said second end of said power source compartment and wherein transmission exhaust duct directs said transmission exhaust from said second end of said power source compartment to said first end of said power source compartment such that said transmission exhaust traverses said power source compartment from at or near said second end to said first end.

* * * * *